United States Patent [19]
Rosenberg

[11] Patent Number: 5,353,993
[45] Date of Patent: Oct. 11, 1994

[54] IRRIGATION SYSTEM, DRIP IRRIGATION DEVICES, AND SADDLE CLAMPS PARTICULARLY USEFUL THEREIN

[76] Inventor: Peretz Rosenberg, Moshav Beit Sha'arim, Israel

[21] Appl. No.: 141,501

[22] Filed: Oct. 25, 1993

Related U.S. Application Data

[63] Continuation of Ser. No. 863,886, Apr. 6, 1992, abandoned.

[30] Foreign Application Priority Data

May 2, 1991 [IL] Israel ......................... 98039

[51] Int. Cl.⁵ .............................. A01G 25/02
[52] U.S. Cl. .................................. 239/542
[58] Field of Search ................... 239/450, 542, 99

[56] References Cited

U.S. PATENT DOCUMENTS

| | | | |
|---|---|---|---|
| 3,782,635 | 1/1974 | Krawczyk | 239/450 X |
| 3,817,454 | 6/1974 | Pira | 239/542 X |
| 3,866,833 | 2/1975 | Shibata et al. | 239/450 X |
| 4,060,200 | 11/1977 | Mehoudar | 239/542 |
| 4,162,041 | 7/1979 | Hane | 239/542 X |
| 4,182,583 | 1/1980 | McEntyre | 239/542 |
| 4,405,084 | 9/1983 | Georgian et al. | 239/99 |
| 4,702,280 | 10/1987 | Zakai et al. | 239/99 X |

FOREIGN PATENT DOCUMENTS 2369002 10/1977 France ........................ 239/542

Primary Examiner—Andres Kashnikow
Assistant Examiner—Kevin Weldon
Attorney, Agent, or Firm—Benjamin J. Barish

[57] ABSTRACT

An irrigation system includes an irrigation line having a plurality of irrigation devices connected along its length, a water supply line extending parallel to the irrigation line, and a plurality of pulsator devices extending in parallel to each other from the water supply line to the irrigation line for feeding water into the irrigation line via a plurality of feeding points each spaced from the next by a plurality of irrigation devices. Also described are a novel drip irrigation line and a novel saddle clamp construction for use in such irrigation system.

19 Claims, 2 Drawing Sheets

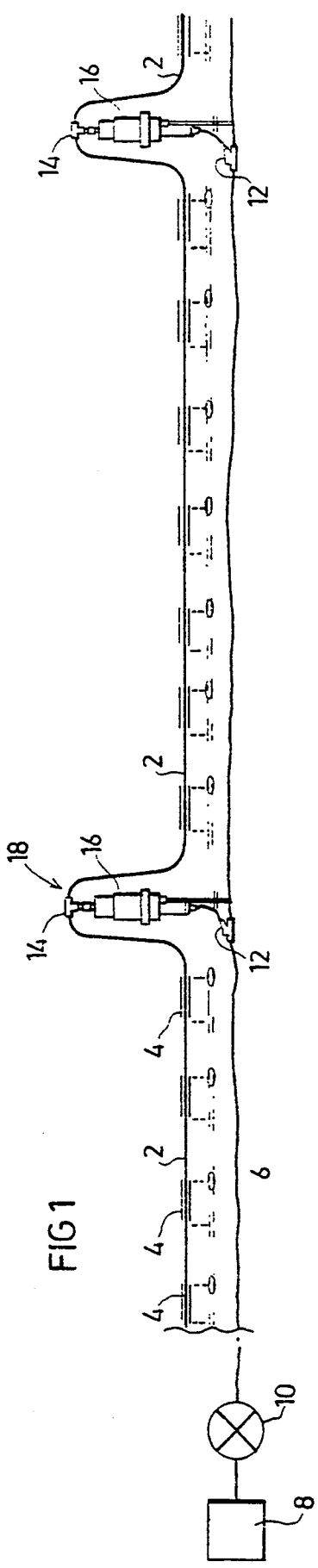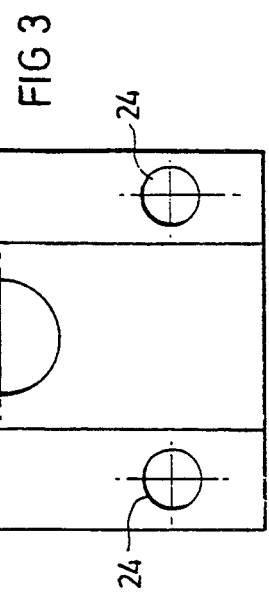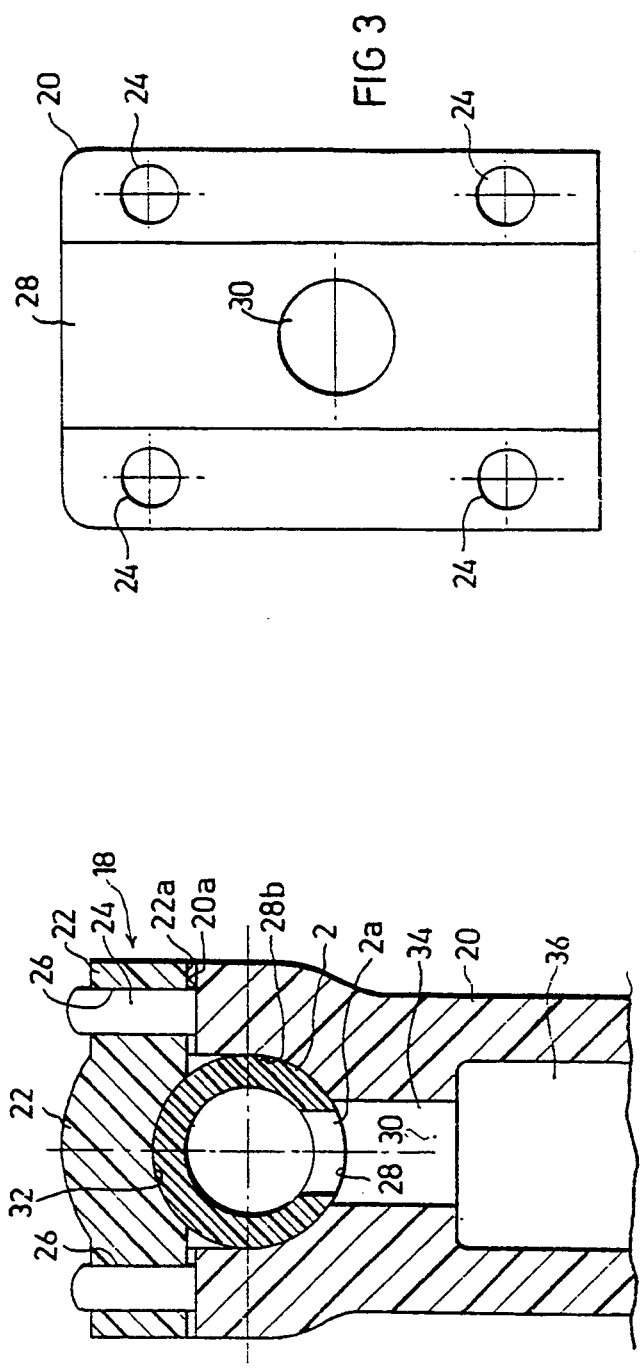

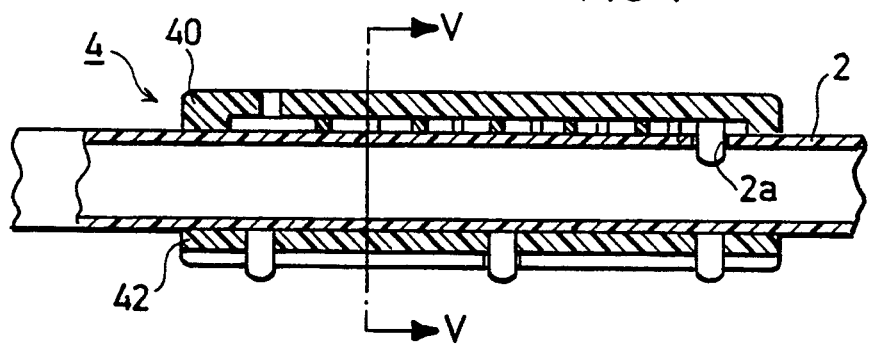
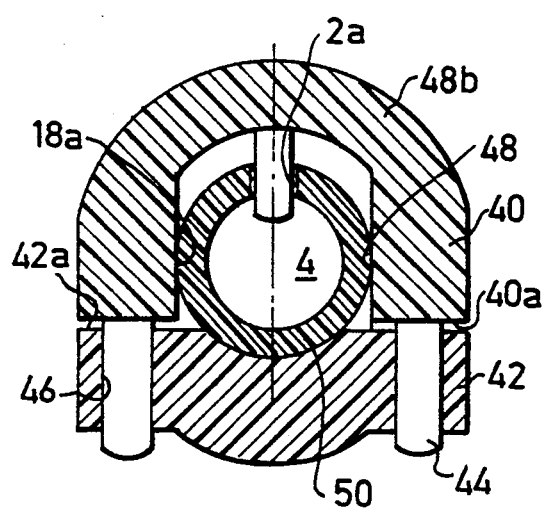
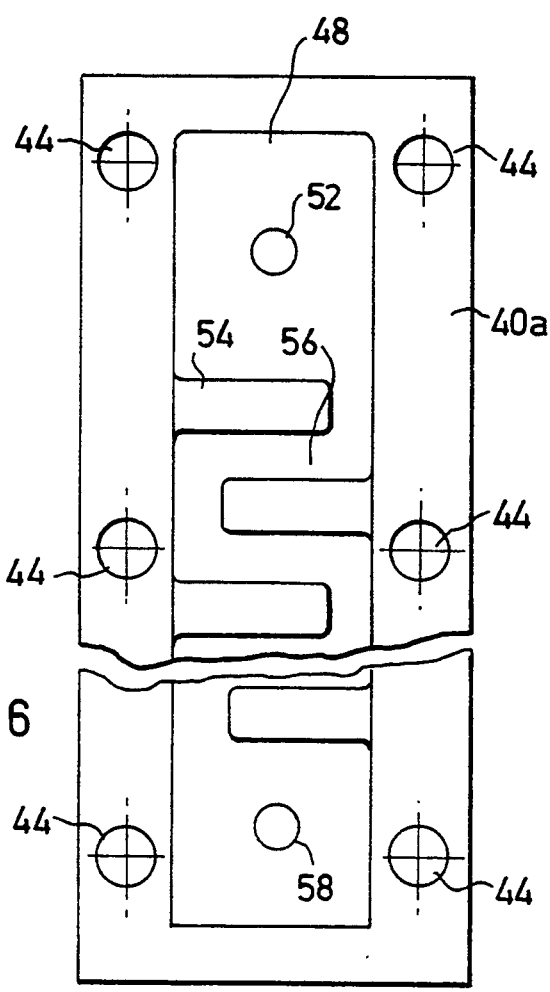
FIG 4
FIG 5
FIG 6

IRRIGATION SYSTEM, DRIP IRRIGATION DEVICES, AND SADDLE CLAMPS PARTICULARLY USEFUL THEREIN

This application is a continuation, of application Ser. No. 07/863,886, filed Apr. 6, 1992 now abandoned.

FIELD AND BACKGROUND OF THE INVENTION

The present invention relates to water irrigation systems, and also to drip irrigation devices and saddle clamps particularly useful in such systems.

The conventional water irrigation system includes a water supply line feeding an irrigation line or a plurality of such lines (commonly called laterals), each line having a plurality of irrigation devices (e.g., dripper devices or sprinkler devices) connected along the length of the line. In the conventional irrigation system, the pressurized water is applied at one end, (the inlet end) of the respective irrigation line or lateral, and is discharged by the irrigation devices along the length of the line. Because of the pressure drop occuring along the length of the line, the number of irrigation devices which can be connected in a single line is significantly limited, and/or each irrigation device is provided with a pressure regulator, in order to maintain a fairly uniform output from all the irrigation devices along the length of the line.

OBJECTS AND BRIEF SUMMARY OF THE INVENTION

One object of the present invention is to provide an irrigation system which permits a large number of irrigation devices to be connected in a single irrigation line or lateral without the need to provide each irrigation device with a pressure regulator and still maintains a fairly uniform output from the irrigation devices along the length of the line.

According to one aspect of the present invention, there is provided an irrigation system, comprising: a continuous, non-interrupted irrigation line having irrigation devices connected along the length of the line; a continuous, non-interrupted water supply line extending parallel to the irrigation line; and a plurality of feeding means extending in parallel to each other from the water supply line to the irrigation line for feeding water into the irrigation line via a plurality of feeding points each spaced from the next by a plurality of irrigation devices. The arrangement is such that all the irrigation devices are connected in series with each other in the continuous, non-interrupted irrigation line, which line is supplied by the plurality of feeding means with water from the water supply line at the plurality of feeding points.

It has been found that in such an irrigation system, wherein the water is introduced into the irrigation line via a plurality of feeding points spaced along the line rather than from a single feeding point at one end of the line, the outputs from all the irrigation devices are fairly uniform even though the irrigation line includes a large number of irrigation devices and each device is not provided with a pressure regulator.

According to further features in the preferred embodiment of the invention described below, each of the feeding means for feeding the water into the irrigation line via the plurality of feeding points includes pressure regulating means, which has been found to further increase the uniformity in the outputs from all the irrigation devices. Such pressure regulating means may be a conventional pressure regulator.

However, particularly good results have been obtained when the pressure regulating means is included in a pulsator device, such as described in my prior U.S. Pat. No. 4,949,747. Such pulsator devices include a housing having a restricted inlet orifice for receiving the water in a continuous manner and at a relatively low rate, and an outlet orifice controlled by an outlet valve which opens at a relatively high pressure and closes at a relatively low pressure. Thus, the water is continuously introduced at a low rate into the housing, thereby increasing the pressure within the housing until the outlet valve opens, at which time the water is discharged at a high rate until the pressure within the housing drops to the predetermined low value for closing the outlet valve. By thus making the opening pressure the same for all the pulsator devices used in the irrigation system, the outlets from all the irrigation devices are made substantially uniform.

The novel irrigation system could be advantageously used with respect to water sprinkler irrigation devices, but has been found particularly advantageous when used with drip irrigation devices.

Another object of the present invention is to provide a novel drip irrigation line particularly useful in the novel irrigation system.

The latter object of the invention is attained by providing a drip irrigation line comprising a flexible, thin-walled plastic tube having a plurality of holes spaced along its length; and a dripper device attached to said flexible tube at each of said holes; said dripper device comprising a housing constituted of two parts attached to each other enclosing the flexible tube at one of said holes; at least one of said housing parts being formed with a recess receiving the flexible tube and having opposite sides firmly engagable with the outer face of the flexible tube when the latter is deformed by pressurized water to thereby effect a seal between the housing and the flexible tube; said one housing part being formed on the inner face of said recess with a grooved formation defining a pressure-dropping passageway with the outer face of the flexible tube; one end of said passageway communicating with the enclosed hole of the flexible tube; said one housing part being further formed with an outlet opening at the opposite end of said passageway. The one housing part is further formed with a registration pin at one end of the passageway and receivable in the hole of the flexible tube. The registration pin is of smaller diameter than the hole to produce a clearance therebetween for the flow of water from the flexible tube into the pressure-dropping passageway.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates one form of irrigation system constructed in accordance with the present invention;

FIG. 2 is an enlarged sectional view illustrating one of the saddle clamps in the irrigation system of FIG. 1;

FIG. 3 is a plan view illustrating one part of the saddle clamp of FIG. 2;

FIG. 4 is an enlarged sectional view illustrating one of the dripper devices in the irrigation system of FIG. 1;

FIG. 5 is a sectional view along line V—V of FIG. 4; and

FIG. 6 is a top plan view illustrating one part of the irrigation device of FIG. 5.

DESCRIPTION OF A PREFERRED EMBODIMENT

The irrigation system illustrated in FIG. 1 is a drip system including a separate, continuous, non-interrupted irrigation line, generally designated 2, and a plurality of drip irrigation devices 4 connected along the length of the line. The irrigation system further includes a continuous non-interrupted water thereto supply line 6 extending parallel to the irrigation line 2 and supplying pressurized water from a source 8, e.g., via a shut-off valve 10. A plurality of feeding lines 12, extending in parallel to each other from the water supply line 6 to the irrigation line 2, feed the water into the irrigation line via a plurality of feeding points 14, each spaced from the next by a plurality of the dripper devices 4. Each feeding line 12 further includes a pulsator device 16 which supplies the water to the feeding point 14 of the irrigation line 2 via a saddle clamp 18 connected to the output of the pulsator device.

In the above-described arrangement, all the irrigation devices are thus connected in series with each other in the irrigation line 2, and the irrigation line is supplied by the plurality of feeding lines 12 with water from the water supply line 6 at a plurality of feeding points each including a pulsator device 16.

Each pulsator device 16 supplies the water to its respective feeding point 14 of the irrigation line 2 at time-spaced intervals. Preferably, the pulsator devices 16 are of the type described in my prior U.S. Pat. No. 4,949,747 cited above, which devices provide the additional advantage of injecting the water into the plurality of feeding points 14 at a substantially uniform pressure. In a system not including such pulsator devices, conventional pressure regulators may be used in the feeding lines 12 for this purpose.

The irrigation line 2 is of a flexible thin-walled plastic tube having a plurality of holes 2a (FIGS. 2–4) spaced along its length and cooperable with the dripper devices 4 and the saddle clamps 18. The construction of each dripper device 4 is described below with reference to FIGS. 4–7, whereas the construction of each saddle clamp 18 is described below with reference to FIGS. 2 and 3.

Each saddle clamp 18, as illustrated in FIGS. 2 and 3, comprises a housing constituted of two parts 20, 22 attached to each other while enclosing the flexible tube 2 of the irrigation line at one of its outlet holes 2a. The two housing parts have flat abutting surfaces, shown at 20a, 22a, respectively. Part 20 is formed with a pair of pins 24 at each of its opposite ends receivable with a friction fit within holes 26 formed in part 22 for securing the two parts together.

Part 20 is further formed with a deep recess 28 extending its complete length and having an opening 30 at its center. Part 22 is formed with a shallow recess 32 aligned with recess 28 of part 20, such that when the two parts are secured together as shown in FIG. 2, the two sides 28a, 28b of the deep recess 28 in part 20 engage the opposite faces of the flexible tube 2, and the shallow recess 32 of part 22 engages an intermediate face of the flexible tube. The foregoing elements are so dimensioned that when the flexible tube 2 is deformed by the pressurized water within it, it firmly engages the two sides 28a, 28b of recess 28, to effect a liquid seal between housing part 20 and the flexible tube 2.

Opening 30 in part 20 is connected by a passageway 34 to a socket 36 receiving the outlet end of the respective pulsator device 16 (FIG. 1). Thus, the water periodically supplied from each pulsator device 16 is fed into the flexible tube 2 via passageway 34, opening 30, and hole 2a at each of the feeding points 14.

As shown particularly in FIGS. 4 and 5, each of the dripper devices 4 also includes a housing constituted of two parts 40, 42 attached to each other while enclosing the flexible tube 2 at one of its outlet holes 2a. The two housing parts also include flat abutting surfaces, as shown at 40a, 42a. Surface 40a is formed with a pair of pins 44 at each of its opposite ends, and with one or more further pair of pins 44 in between (depending on the length of the part) as shown in FIG. 6, which pins are received within corresponding openings 46 formed in housing part 42. Part 40 is further formed with a deep recess 48 extending for its length, and part 42 is formed with a shallower recess 50 also extending for its length. These elements are also dimensioned such that when the received flexible tube 2 is deformed by pressurized water, the opposite faces of the tube firmly engage sides 48a, 48b of the deep recess 40, to effect a liquid seal between tube 2 and the interior of recess 48.

Recess 48 in part 40 is further formed with a registration pin 52 which is received within a hole 2a of the flexible tube 2 for registering the dripper device on the flexible tube. Pin 52 is of smaller diameter than that of hole 2a, to produce a clearance 53 for the flow of water from the flexible tube 2 into the interior of recess 48 of part 40.

The inner face of recess 48 of part 40 is formed with a plurality of ribs 54 producing a groove formation 56 which defines, with the outer face of the flexible tube 2, a pressure-dropping passageway extending from pin 52 to an outlet opening 58 at the opposite end of part 40. It will thus be seen that the water entering the interior of housing part 40, via the clearance 53 between its pin 52 and hole 2a in the flexible tube 2, will flow through the pressure-dropping passageway 56, as shown by arrow 37, and will be outputted at a reduced rate via outlet opening 58.

The irrigation system illustrated in the drawings operates as follows:

The water from pressurized water source 8 is applied, e.g., via shut-off valve 10, to the water supply line 6 in a continuous manner. The water from the supply line 6 is fed via the feeding lines 12 to the pulsator devices 16. These devices feed the water at time-spaced intervals to the plurality of feeding points 14 of the irrigation line 2, which discharges the water via its plurality of dripper devices 4 disposed along its length.

As indicated earlier, such an arrangement has been found to produce a very efficient irrigation system in which a large number of dripper devices 4 may be connected to the irrigation line 2 and which yet produces a substantially uniform output even when each dripper device is not equipped with a pressure regulator.

While the invention has been described with respect to one preferred embodiment, it will be appreciated that many modifications and other applications may be made. For example, instead of utilizing the system for drip irrigation, it may also be used in other forms of irrigation, such as sprinkler irrigation. Also, the pulsator devices 16 for feeding the water to the plurality of feeding points in the irrigation line 2 may be omitted or replaced by pressure regulators at these feeding points. Further, the described drip irrigation device 4, and also the saddle clamp 18, may be used in other applications.

Many other variations, modifications and applications of the invention will be apparent.

What is claimed is:

1. An irrigation system, comprising:
    a continuous, non-interrupted irrigation line having irrigation devices connected along the length of the line;
    a continuous, non-interrupted water supply line separate from and extending parallel to the irrigation line;
    and a plurality of feeding lines extending in parallel to each other from the water supply line to the irrigation line for feeding water into the irrigation line via a plurality of feeding points each spaced from the next by a plurality of irrigation devices, such that all said irrigation devices are connected in series with each other in said irrigation line, and said continuous, non-interrupted irrigation line is supplied by said plurality of feeding lines with water from the water supply line at said plurality of feeding points.

2. The irrigation system according to claim 1, wherein each of said feeding line includes pressure-regulating means for feeding the water into the irrigation line via each feeding point at substantially the same pressure.

3. The irrigation system according to claim 1, wherein each of said feeding lines includes a pulsator device for feeding the water into the irrigation line via each feeding point at time-spaced intervals.

4. The irrigation system according to claim 1, wherein said irrigation line is a drip irrigation line, and said irrigation devices are dripper devices.

5. The irrigation system according to claim 4, wherein said dripper irrigation line is a flexible, thin-walled plastic tube having a plurality of holes spaced along its length; and wherein each of said dripper devices includes a housing constituted of two parts attached to each other enclosing the flexible tube at a respective one of said holes; at least one of said housing parts being formed with a recess receiving the flexible tube and having opposite sides firmly engagable with the outer face of the flexible tube when the latter is deformed by pressurized water to thereby effect a seal between the housing and its flexible tube.

6. The irrigation system according to claim 5, wherein said one housing part is formed on the inner face of said recess with a grooved formation defining a pressure-dropping passageway with the outer face of the flexible tube; one end of said passageway communicating with a respective hole of the flexible tube; said one housing part being further formed with an outlet opening at the opposite end of said passageway.

7. The irrigation system according to claim 6, wherein said one housing part is further formed with a registration pin at said one end of the passageway and receivable in said respective hole of the flexible tube; said registration pin being of smaller diameter than said hole to produce a clearance therebetween for the flow of water from the flexible tube into said pressure-dropping passageway.

8. The irrigation system according to claim 6, wherein said two housing parts include abutting faces formed with cooperable attachment pins and openings for attaching the two parts together by a friction fit.

9. The irrigation system according to claim 8, wherein said abutting faces of the housing parts are flat, said one housing part being formed with a pair of pins at each of its opposite ends, said other housing part being formed with a pair of openings at each of its opposite ends for receiving said pins with a friction fit.

10. The irrigation system according to claim 1, wherein said irrigation line is a flexible thin-walled plastic tube having a plurality of holes spaced along its length; and wherein each of said feeding lines comprises a saddle clamp connecting same to said flexible tube and including a housing constituted of two parts attached to each other while enclosing the flexible tube at a respective one of said holes; at least one of said housing parts being formed with a recess receiving the flexible tube and having opposite sides firmly engagable with the outer faces of the flexible tube when the tube is deformed by pressurized water, to thereby effect a seal between the housing and the flexible tube.

11. The irrigation system according to claim 10, wherein said one housing part is formed with an opening aligned with said respective hole of the flexible tube.

12. The irrigation system according to claim 10, wherein said two housing parts include abutting faces formed with cooperable attachment pins and openings for attaching the two parts together by a friction fit.

13. The irrigation system according to claim 12, wherein said abutting faces of the housing parts are flat, said one housing part being formed with a pair of pins at each of its opposite ends, said other housing part being formed with a pair of openings at each of its opposite ends for receiving said pins with a friction fit.

14. A drip irrigation line, comprising:
    a flexible, thin-walled plastic tube having a plurality of holes spaced along its length;
    and a dripper device attached to said flexible tube at a respective one of said holes;
    said dripper device comprising a housing constituted of two parts attached to each other enclosing the flexible tube at said respective hole;
    at least one of said housing parts being formed with a recess receiving the flexible tube and having opposite sides firmly engagable with the the outer face of the flexible tube when the latter is deformed by pressurized water to thereby effect a seal between the housing and the flexible tube;
    said one housing part being formed on the inner face of said recess with a grooved formation defining a pressure-dropping passageway with the outer face of the flexible tube; one end of said passageway communicating with said respective hole of the flexible tube; said one housing part being further formed with an outlet opening at the opposite end of said passageway;
    said one housing part being further formed with a registration pin at said one end of the passageway and receivable in said respective hole of the flexible tube;
    said registration pin being of smaller diameter than said respective hole to produce a clearance therebetween for the flow of water from the flexible tube into said pressure-dropping passageway.

15. The drip irrigation line according to claim 14, wherein said two housing parts include abutting faces formed with cooperable attachment pins and openings for attaching the two parts together by a friction fit.

16. The drip irrigation line according to claim 15, wherein said abutting faces of the housing parts are flat, said one housing part being formed with a pair of pins at each of its opposite ends, said other housing part being formed with a pair of openings at each of its opposite ends for receiving said pins with a friction fit.

17. An irrigation system, comprising:

an irrigation line having a plurality of irrigation devices connected along the length of the line;

a water supply line extending parallel to the irrigation line;

and a plurality of feeding means extending in parallel to each other from the water supply line to the irrigation line for feeding water into the irrigation line via a plurality of feeding points each spaced from the next by a plurality of irrigation devices; each of said feeding means including a pulsator device for feeding the water into the irrigation line via each feeding point at time-spaced intervals.

18. The irrigation system according to claim 17, wherein said irrigation line is a drip irrigation line, and said irrigation devices are dripper devices.

19. The irrigation system according to claim 18, wherein said dripper irrigation line is a flexible, thin-walled plastic tube having a plurality of holes spaced along its length; and wherein each of said dripper devices includes a housing constituted of two parts attached to each other enclosing the flexible tube at one of said holes; at least one of said housing parts being formed with a recess receiving the flexible tube and having opposite sides firmly engagable with the outer face of the flexible tube when the latter is deformed by pressurized water to thereby effect a seal between the housing and its flexible tube.

* * * * *